US005782349A

United States Patent [19]
Combs

[11] Patent Number: 5,782,349
[45] Date of Patent: Jul. 21, 1998

[54] CD ROM HOLDER SUITABLE FOR BINDING

[76] Inventor: Jeff Combs, 179 Country Aire, Greenwood, Ind. 46143

[21] Appl. No.: 879,357

[22] Filed: Jun. 20, 1997

[51] Int. Cl.$^6$ .................. B65D 85/57; B65B 35/54; B42D 1/00
[52] U.S. Cl. .................. 206/308.1; 53/445; 206/232; 206/312; 281/31; 281/38; 402/79
[58] Field of Search .................. 206/307, 308.1, 206/308.2, 309, 311, 312, 313, 232; 281/31, 38; 402/79; 383/40, 107, 119, 207, 209; 53/445

[56] References Cited

U.S. PATENT DOCUMENTS

| | | | |
|---|---|---|---|
| 2,306,726 | 12/1942 | Hasin | 206/312 X |
| 2,345,230 | 3/1944 | Bender | 206/311 |
| 2,512,577 | 6/1950 | Franck | 206/312 |
| 3,009,707 | 11/1961 | Schulein | 206/312 X |
| 3,372,859 | 3/1968 | Bjorkengren et al. | 383/107 X |
| 3,758,136 | 9/1973 | Guyer | 281/31 X |
| 4,492,306 | 1/1985 | Cooper et al. | 402/79 X |
| 4,599,658 | 7/1986 | Sfikas | 281/31 X |
| 5,090,561 | 2/1992 | Spector | 206/313 |
| 5,462,160 | 10/1995 | Youngs | 206/312 |
| 5,588,527 | 12/1996 | Youngs | 206/308.1 |
| 5,590,912 | 1/1997 | Stevens | 206/308.1 X |
| 5,669,491 | 9/1997 | Pettey | 206/232 |
| 5,690,220 | 11/1997 | Swan | 206/308.1 |
| 5,694,743 | 12/1997 | Beighle | 53/445 |
| 5,713,605 | 2/1998 | Pace et al. | 206/308.1 X |

FOREIGN PATENT DOCUMENTS

| | | | |
|---|---|---|---|
| 1213757 | 4/1960 | France | 281/31 |
| 363316384 | 12/1988 | Japan | 206/308.1 |
| 341146 | 1/1931 | United Kingdom | 281/31 |

OTHER PUBLICATIONS

Gianandrea, *Radio Frequency Sealing*, 1990, Modern Plastics Encyclopedia.

*Primary Examiner*—Byron P. Gehman
*Attorney, Agent, or Firm*—Woodard, Emhardt, Naughton Moriarty & McNett

[57] ABSTRACT

A CD-ROM holder suitable for binding. In a preferred embodiment, the CD-ROM is sealed between two vinyl sheets by means of a heat sealing operation. A cardboard spacer is positioned around the CD-ROM in order to limit its movement and to provide a consistent thickness across a majority of the holder. The holder is then gathered with the signatures of the book and bound therewith, after which a portion of the holder is trimmed off in the book trimming operation. One of the heat seal lines on the holder provides a convenient tear line for removing the holder (and hence the CD-ROM) from the bound book.

18 Claims, 8 Drawing Sheets

5,782,349

CD ROM HOLDER SUITABLE FOR BINDING

TECHNICAL FIELD OF THE INVENTION

The present invention generally relates to book binding and, more particularly, to a CD-ROM holder suitable for binding.

BACKGROUND OF THE INVENTION

It has become increasingly common for books to be sold with an accompanying CD-ROM (Compact Disc—Read Only Memory). The CD-ROM contains computer software and/or data which may be utilized with a computer. Typically, the information contained on the CD-ROM complements and/or augments the information contained in the book, and the book and CD-ROM are intended for use together.

Currently, most such applications relate to books about computers and computer software, where the CD-ROM contains examples to be run on a computer that are complementary to the instructional text in the book. However, with the proliferation of personal computers, it is becoming increasingly common for books on non-technical subjects to include a CD-ROM. For example, a book about Africa might include a CD-ROM containing video segments of local wildlife and native culture.

As shown in FIGS. 1 and 2, the prior art method for packaging a CD-ROM 10 with a book 12 is to insert the CD-ROM 10 into a plastic or paper sleeve pocket 14 which is then affixed to the inside back cover of the book 12, such as by adhesive tape. This prior art method is extremely costly, as the CD-ROMs 10 must be affixed to the books 12 after the books 12 are bound. In a typical prior art process, a pallet load of books 12 are delivered to the printer from the bindery and machine or manual labor is used to insert the CD-ROM 10 into the sleeve pocket 14, which is then applied to the inside back cover of the book 12. Such secondary labor operations are obviously very time consuming and extremely expensive. They require double handling of the books 12, added shipping charges between the bindery and the printer, and require the books 12 to be boxed off-line from the binding process. This increases the cost of the book, making it more difficult for the publisher to sell the book, or reducing the profit margin on the book.

Another problem associated with the prior art method is that the CD-ROM 10 is not securely attached to the book 12. It is common for many of the CD-ROMs 10 to fall out of the books 12 during shipping and retail handling. It is also common for the CD-ROMs 10 to be stolen from the books 12 that are on retail display, as the CD-ROM 10 is easily accessible and removable.

There is therefore a need for a CD-ROM holder that may be affixed to a book during the binding process. There is also a need for a CD-ROM holder that prevents the CD-ROM from becoming disassociated with the book during shipping and retail handling. Finally, there is a need for a CD-ROM holder that makes retail theft of the CD-ROM difficult. The present invention is directed toward meeting these needs.

SUMMARY OF THE INVENTION

The present invention relates to a CD-ROM holder suitable for binding. In a preferred embodiment, the CD-ROM is sealed between two vinyl sheets by means of a heat sealing operation. The holder is then gathered with the signatures of the book and bound therewith. One of the heat seal lines on the holder provides a convenient tear line for removing the holder (and hence the CD-ROM) from the bound book.

In one form of the invention a data disk holder suitable for binding is disclosed, comprising first and second sheets of heat-sealable material; a data disk positioned between the first and second sheets; and at least one heat-seal fusing the first and second sheets; wherein the data disk is substantially surrounded by the heat-seal and cannot be removed from the holder without breaking the heat-seal or cutting one of the first and second sheets.

In another form of the invention a method for binding a data disk into a book is disclosed, comprising the steps of: a) providing first and second sheets of heat-sealable material; b) positioning the data disk between the first and second sheets; c) forming at least one heat-seal fusing the first and second sheets, thereby forming a data disk holder, wherein the spacer is substantially surrounded by the heat-seal; d) providing at least one printed signature; e) gathering the holder with the at least one signature; and f) binding the holder and the at least one signature in order to form the book.

In another form of the invention a method for forming a data disk holder suitable for binding is disclosed, comprising the steps of: a) providing first and second sheets of heat-sealable material; b) positioning the data disk between the first and second sheets; and c) forming at least one heat-seal fusing the first and second sheets, thereby forming a data disk holder, wherein the spacer is substantially surrounded by the heat-seal.

DETAILED DESCRIPTION OF THE PREFERRED EMBODIMENT

Figure 1:
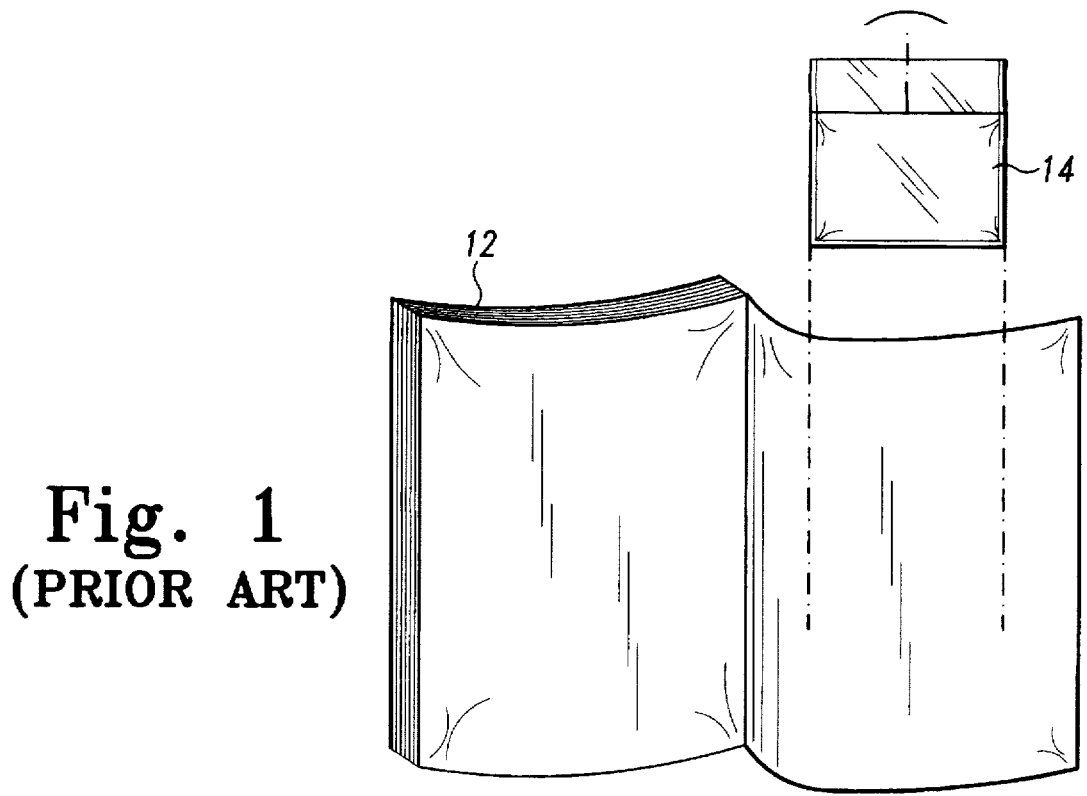
FIG. 1 is an exploded perspective view of a prior art means for attaching a CD-ROM to a book.
Figure 2:
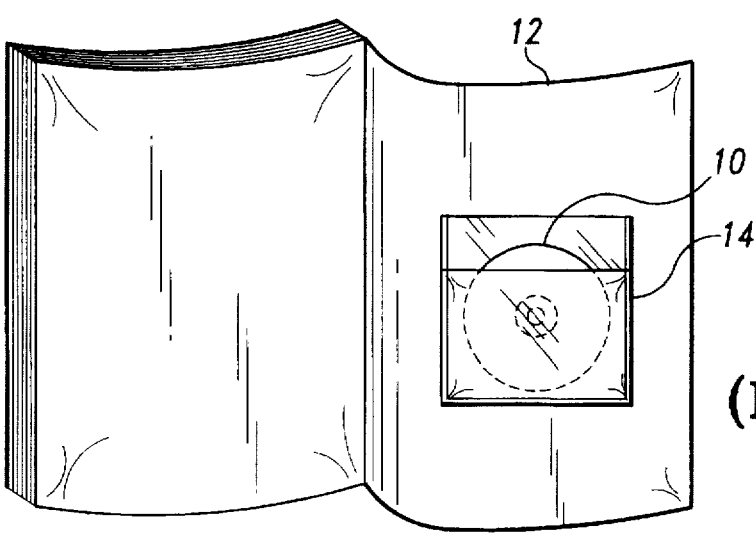
FIG. 2 is a perspective view of the prior art means for attaching a CD-ROM to a book.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 3:
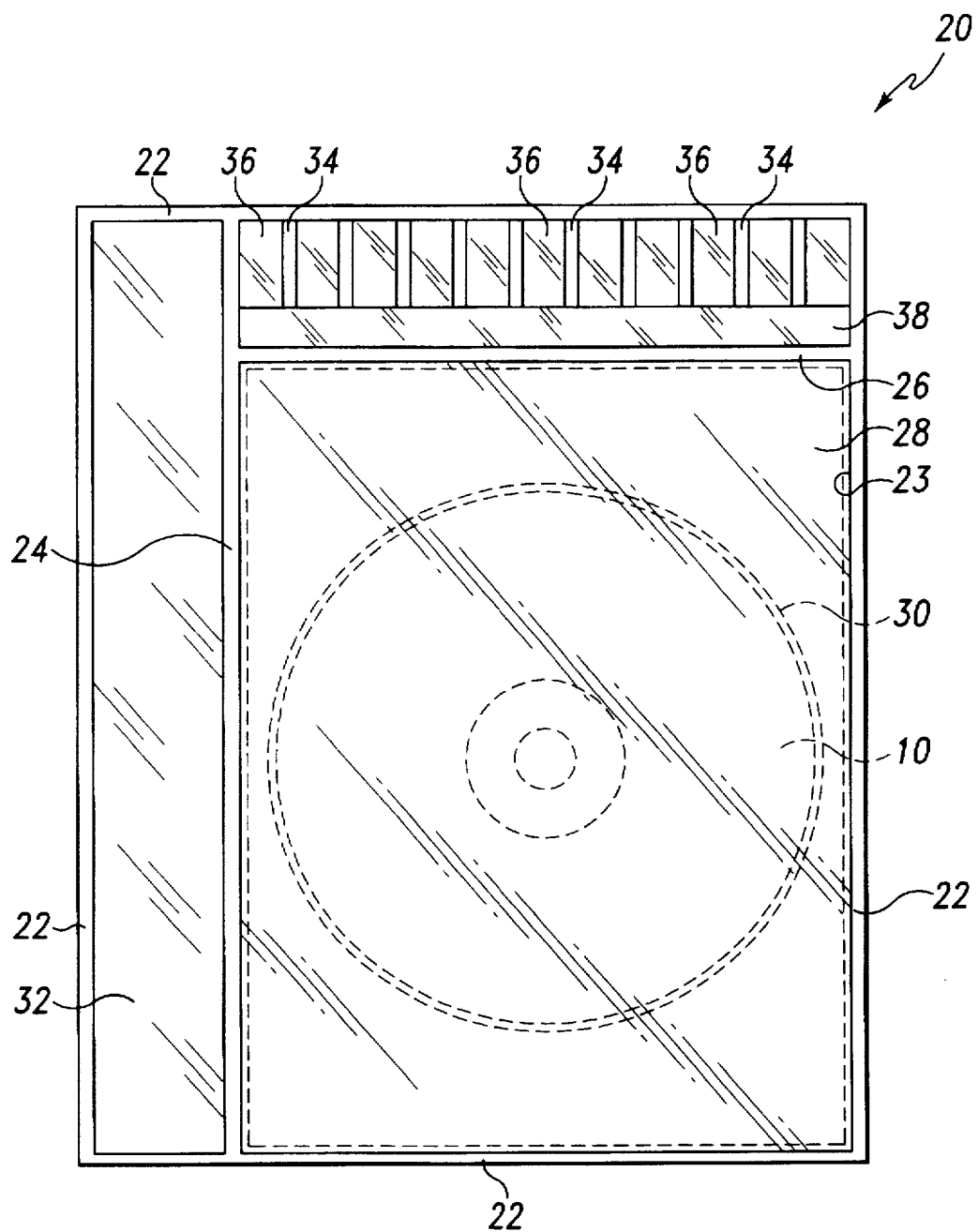
FIG. 3 is a plan view of a preferred embodiment CD-ROM holder of the present invention.

Referring now to FIG. 3, there is illustrated a preferred embodiment of the CD-ROM holder of the present invention, indicated generally at 20. The CD-ROM holder 20 is formed from two overlying sheets of vinyl or other material which may be heat sealed. In a preferred embodiment, the CD-ROM holder 20 is formed from two sheets of 12 gauge (0.012") frosty clear vinyl having a matte finish on one side. The CD-ROM holder 20 is formed by placing one sheet of vinyl upon a flat, horizontal surface, placing a CD-ROM 10 on top of the first vinyl sheet, placing a second vinyl sheet on top of the CD-ROM 10, and then sealing the two vinyl sheets together so that the CD-ROM 10 is encapsulated therein. The seals on the two sheets of vinyl are preferably formed by a heated die, such as a die which utilizes radio frequency (RF) heating.

In a preferred embodiment, the CD-ROM holder 20 includes edge seals 22 which substantially completely surround a perimeter of the CD-ROM holder 20. The space or pocket 23 which captures the CD-ROM 10 is further delineated by a longitudinal seal 24 and a transverse seal 26. The enclosed pocket 23 which captures the CD-ROM 10 is therefore bounded on the left by the longitudinal seal 24, on the bottom by the bottom seal 22, on the right by the right hand seal 22 and on the top by the transverse seal 26. Although the present invention comprehends a CD-ROM in which the CD-ROM 10 is simply contained within this sealed pocket 23, the preferred embodiment 20 of the present invention also includes a spacer 28 within the pocket 23 containing the CD-ROM 10. The exterior dimensions of the spacer 28 are slightly smaller than the dimensions of the pocket 23 into which it is sealed, and the spacer 28 includes a circular cut-out 30 therein which is slightly larger than the CD-ROM 10, thereby allowing the CD-ROM 10 to fit within the circular cut-out 30. Provision of the spacer 28 within the sealed pocket 23 substantially prevents movement of the CD-ROM 10 within the pocket 23 and has further advantages as described hereinbelow. In a preferred embodiment, the spacer 28 is formed from a cardboard material having a thickness ranging from 24 points–30 points (0.024"–0.030") and is die cut from white C1S blanks, such as those manufactured by Springhill and available from International Paper Company of Memphis, Tenn.

The longitudinal seal 24 further defines a land 32 on the left hand side of the CD-ROM holder 20. This is the edge that will be bound into the book, and formation of the land 32 ensures that the pocket 23 containing the CD-ROM 10 is spaced from the book binding. The land 32 has further advantages in the signature grabbing operation of the binding process, as described hereinbelow. The CD-ROM holder 20 further includes a series of short longitudinal seals 34 which form small lands 36 therebetween. Wheels 34 and lands 36 provide a relatively stiff upper edge to the CD-ROM holder 20, which is desirable due to the fact that this upper edge of the CD-ROM holder 20 will be pushed by the binder along with the remaining signatures of the book, as described hereinbelow. Finally, a relatively wide transverse seal 38 is formed between the longitudinal seals 34 and the pocket 23 which holds the CD-ROM 10 and spacer 28. As described in greater detail hereinbelow, the relatively wide seal 38 provides a clear area in which the upper edge of the book 12 may be trimmed after binding. The width of the seal area 38 allows for a wide range of tolerances in the trimming operation.

Figure 4:
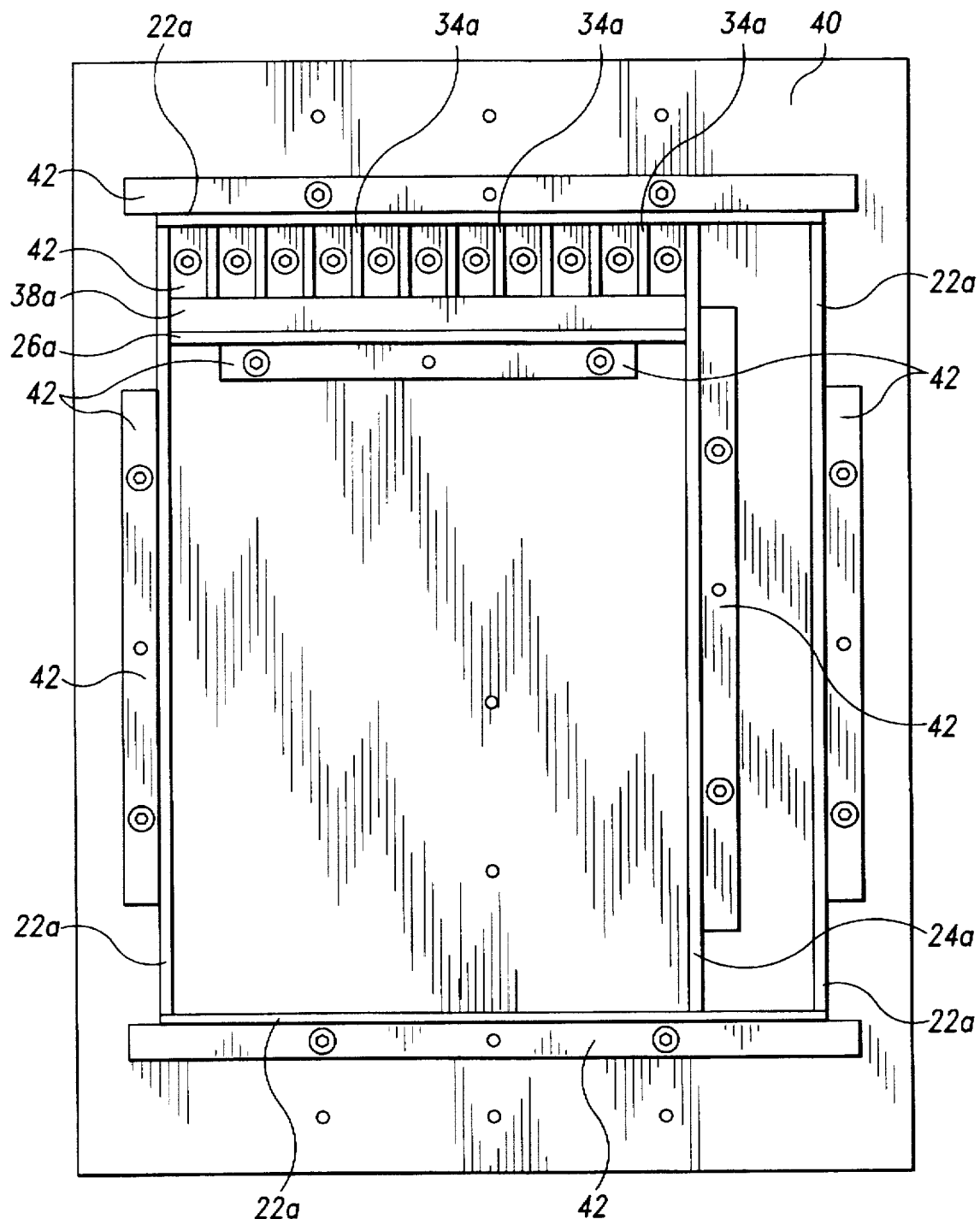
FIG. 4 is a plan view of a die used to form the preferred embodiment CD-ROM holder of FIG. 3.

Referring now to FIG. 4, there is illustrated a plan view of the preferred embodiment CD-ROM holder 20 heat-sealing die. The die is formed upon a base 40 upon which the various sealing bars are held by means of a series of chocks 42 that are screwed into the base 40, as is known in the art. The sealing bars in FIG. 4 have been labelled so that they correspond numerically with the seals formed in the CD-ROM holder 20 as illustrated in FIG. 3. For example, the sealing bar which corresponds to the seal 24 is labelled 24a, while the sealing bar which corresponds to the seal 38 is labelled 38a. The remaining sealing bars are numbered in an analogous manner.

As is known in the art, it is common practice to print and assemble book pages into signatures which are then gathered together for binding, such as by a perfect binding process. One advantage of the CD-ROM holder of the present invention is that it may be treated like a book signature during the binding process and may therefore flow through the normal binding equipment. During such a perfect binding process, the signatures are gathered in the desired order, with the CD-ROM holder 20 being treated as one of the signatures. A hot melt adhesive is then applied to the binding edge of the signatures and a cover 50 is then wrapped therearound. When the adhesive sets, the signatures (including the CD-ROM holder 20) are bound to each other and to the cover 50. It should be noted that, while the CD-ROM holder 20 is typically placed between the last paper signature and the back cover 50 of the book 12, the CD-ROM holder 20 may be placed at any location within the book due to the fact that it is treated like any other signature during the binding process.

As is known in the art, the book signatures are gathered together by a gathering machine in preparation for applying the cover 50. The gathering machine chain pushes on the signatures along the top edge (using the orientation of FIG. 5) in order to move the signatures through the machine. Because the CD-ROM holder 20 is being pushed along this top edge, the seals 34 and lands 36 are formed along this edge in order to provide structural rigidity to the CD-ROM holder 20 at this location. The structure 34, 36 prevents the relatively flexible vinyl material from which the CD-ROM holder 20 is made from buckling as it is being pushed by the gathering machine chain. Furthermore, the land 32 is provided along the left edge of the CD-ROM holder 20 in order to provide a surface to be inserted into the hot melt adhesive that will form the binding of the book 12.

Figure 5:
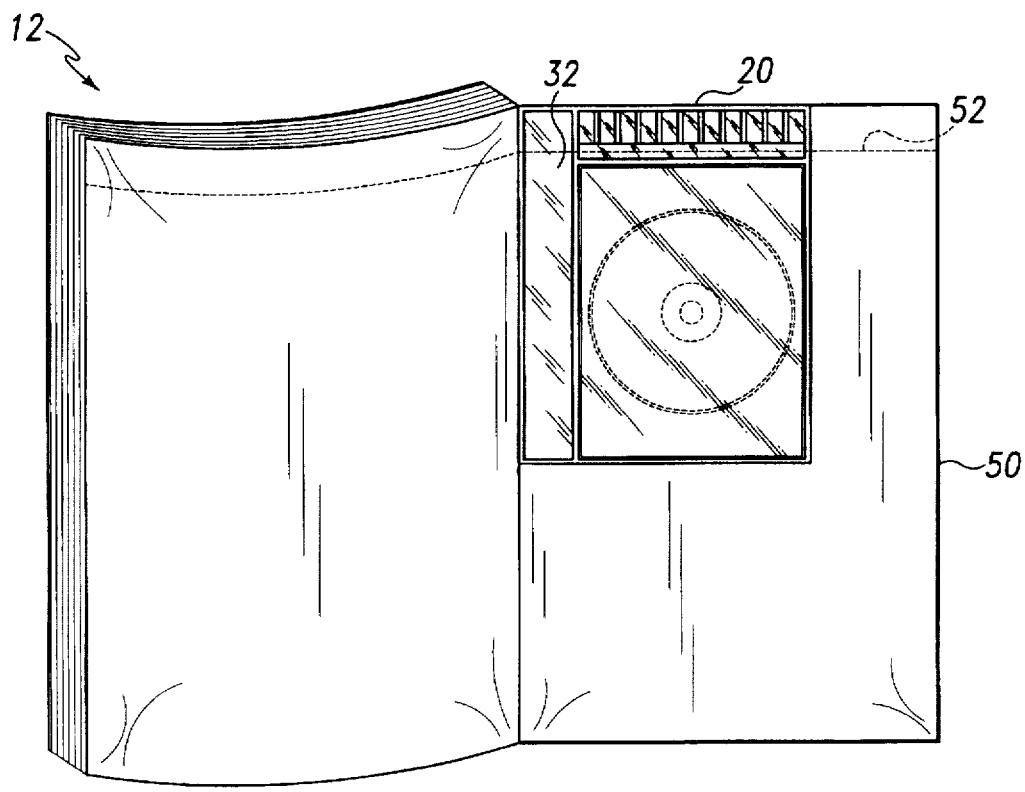
FIG. 5 is a perspective view of the preferred embodiment CD-ROM holder of the present invention bound into a book prior to trimming.
Figure 6:
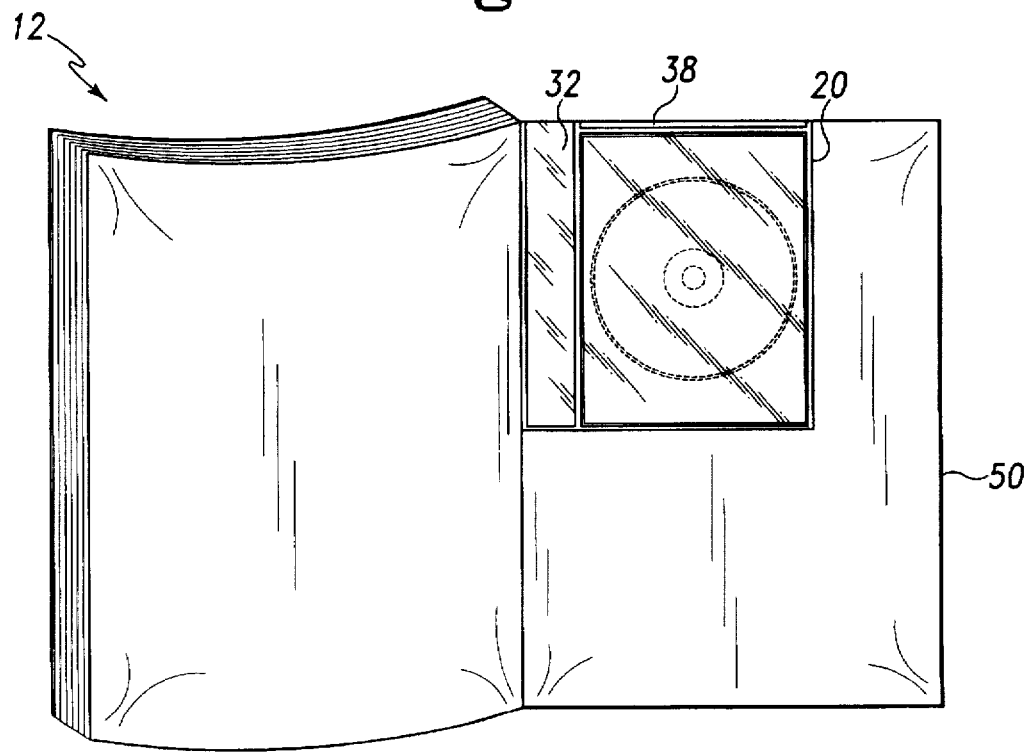
FIG. 6 is a perspective view of the preferred embodiment CD-ROM holder of the present invention bound into a book after trimming.

As illustrated in FIG. 5, the book 12 signatures, including the CD-ROM holder 20 signature, are formed with dimensions that exceed the finished dimension of the book 12. This allows for the bound signatures to be trimmed in order to provide a clean edge on all sides of the book 12. The dashed line 52 indicates the line along which the trimming cut will be made at the upper end of the book 12. The book 12 is illustrated in FIG. 6 after this trimming operation has taken place. As is readily apparent from the drawings, the upper trimming cut extends through the seal 38 on the CD-ROM holder 20, thereby causing the upper portion of the CD-ROM holder 20 that includes the seals 34 and the lands 36 to be discarded. As discussed hereinabove with reference to FIG. 3, the seal 38 is formed as a relatively wide seal in order to allow for tolerances in the trimming operation.

Figure 7:
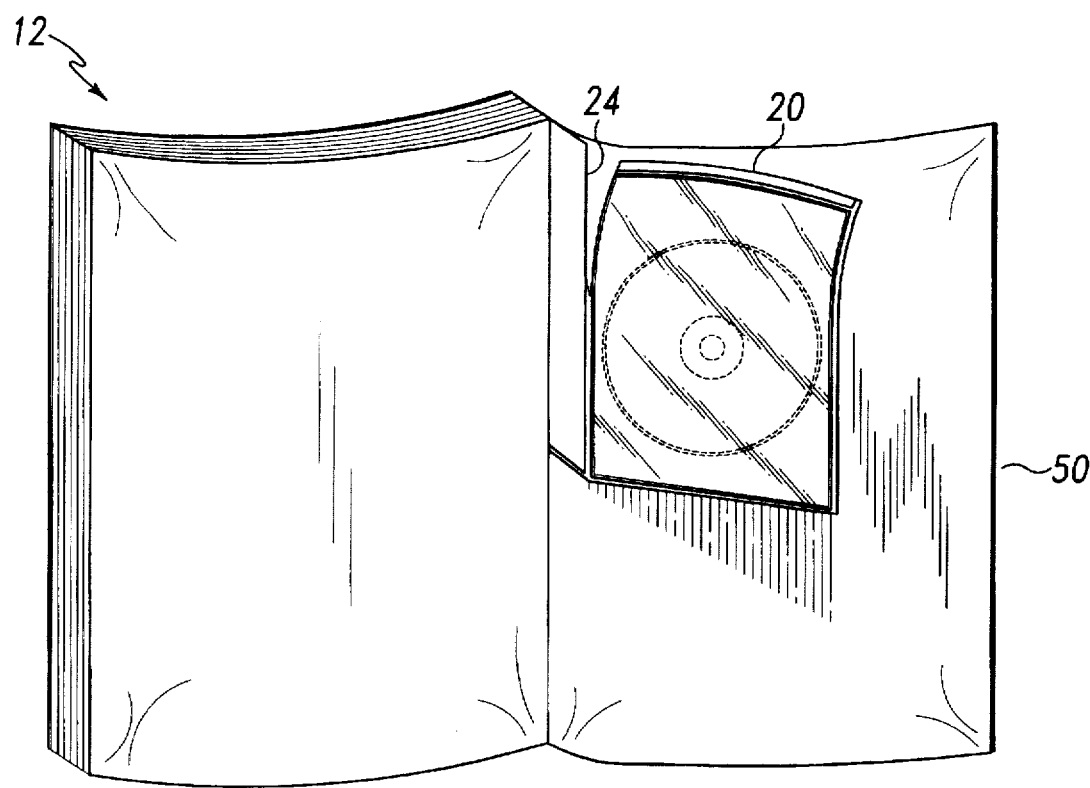
FIG. 7 is a perspective view of the preferred embodiment CD-ROM holder of the present invention being torn out of a book into which it is bound.
Figure 8:
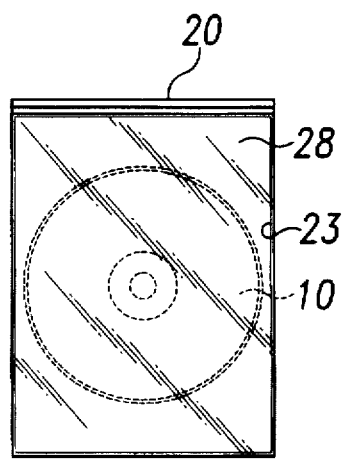
FIG. 8 is a plan view of the preferred embodiment CD-ROM holder of the present invention after it has been removed from a book into which it was bound.

As shown in FIG. 7, after the CD-ROM holder 20 has been securely bound into the book 12, it may be removed therefrom by tearing the CD-ROM holder 20 along the longitudinal seal 24. Formation of the longitudinal seal 24 into the vinyl material of the CD-ROM holder 20 forms a natural tear line in this material, facilitating removal of the pocket which contains the CD-ROM from the land portion 32. As illustrated in FIG. 8, after the CD-ROM holder 20 has been removed from the book 12, it remains encapsulated in the relatively compact pocket 23 which holds the CD 10 and the spacer 28. Because the CD-ROM holder 20 is incorporated into the book 12 automatically during the binding process, a minimal amount of manual labor is required in order to integrate the CD-ROM 10 with the book 12, thereby lowering the cost for producing the book 12. Furthermore, because the CD 10 is encapsulated within the pocket 23 of the CD-ROM holder 20, there is no possibility of the CD-ROM 10 accidentally slipping out of the book 12. Finally, the CD-ROM holder 20 of the present invention acts as a theft deterrent. Rather than simply removing the CD from the sleeve pocket in the back of the book as in the prior art design, a would-be thief would have to tear the CD-ROM holder 20 from the back of the book, after which the CD-ROM holder 20 is still generally too big to fit inside most clothing pockets. In order to remove the actual CD-ROM 10 from the CD-ROM holder 20, the vinyl must be cut with a pair of scissors or a knife—an operation that would be fairly time consuming and noticeable if done within a retail establishment. The CD-ROM holder 20 of the present invention therefore presents a substantial deterrent to retail theft.

Figure 9:
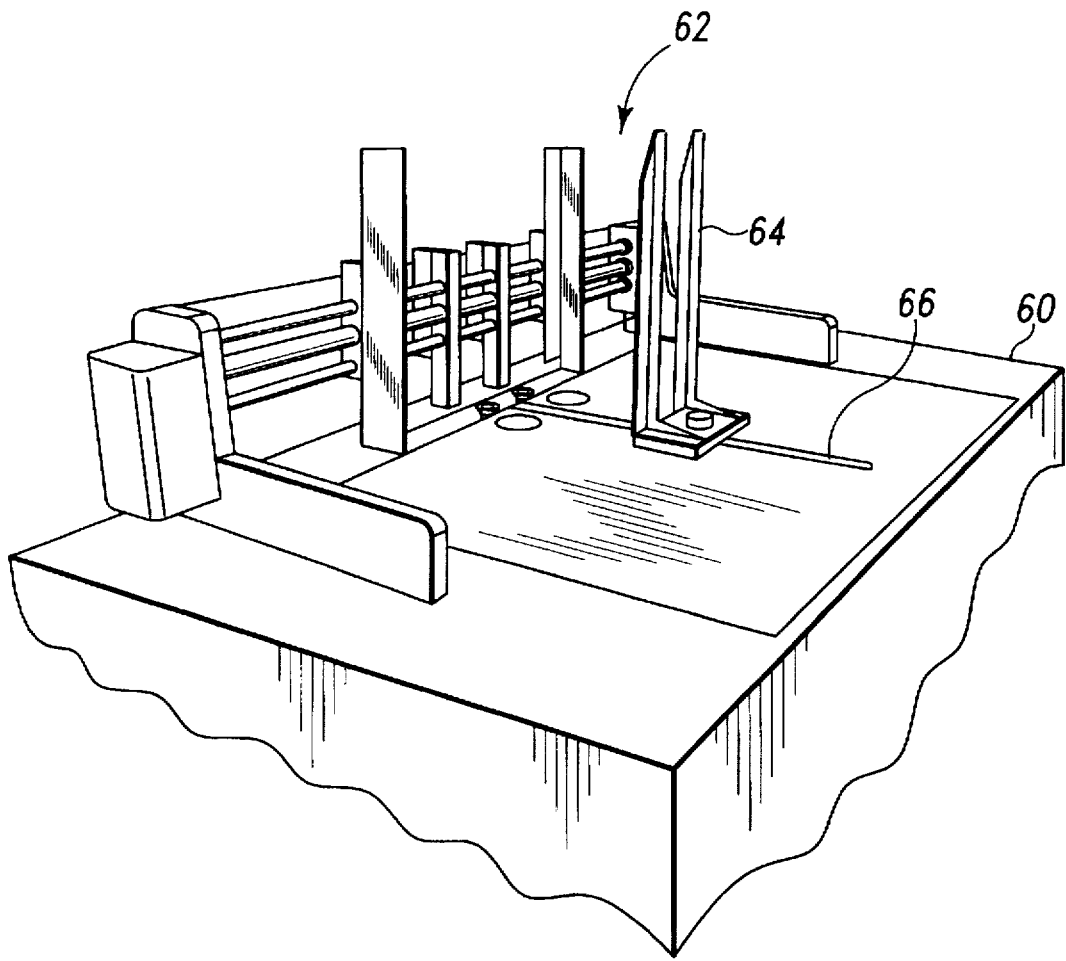
FIG. 9 is a perspective view of a signature grabbing machine used with the CD-ROM holder of the present invention.
Figure 10:
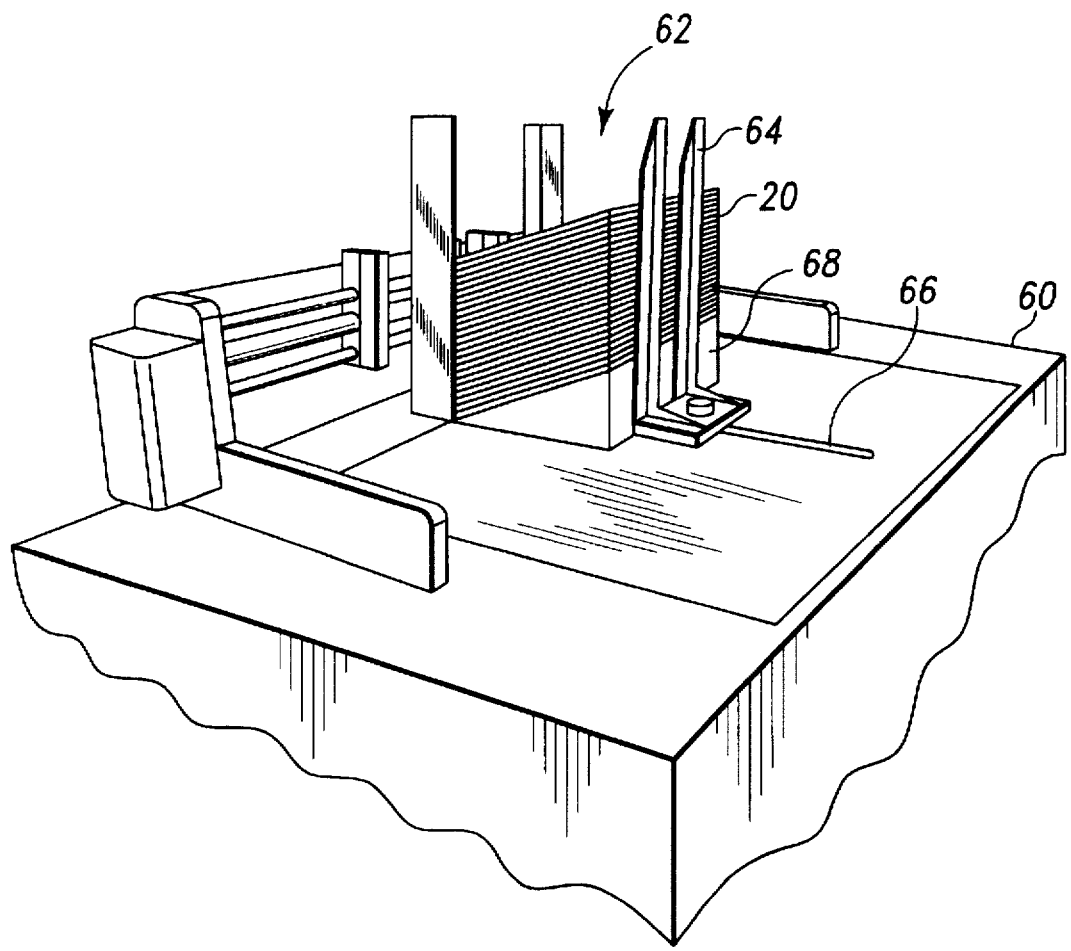
FIG. 10 is a perspective view of the signature grabbing machine of FIG. 9 with an attachment adapting the machine for use with the CD-ROM holder of the present invention.

Referring now to FIG. 9, there is illustrated a signature grabber 60 which may be used with the CD-ROM holder 20 of the present invention. The signature grabber 60 includes a hopper 62 into which a stack of identical signatures is placed prior to the signature gathering process. The hopper 62 includes an adjustable post 64 which is adapted to move within the slide channel 66, thereby adjusting the size of the hopper 62 for differently sized signatures. In order to facilitate use of the signature grabber 60 with the CD-ROM holder 20 of the present invention, a wedge shape spacer 68 is placed in the bottom of the hopper 62. The wedge shaped spacer 68 is formed such that the upper surface thereof makes an angle (such as 30°–45°) with the horizontal. A stack of CD-ROM holders 20 is then placed on the upper surface of the spacer 68. The CD-ROM holders 20 are preferably oriented such that the land 32 is facing the lower edge of the inclined slope of spacer 68.

As is known in the art, the signature grabber 60 operates by pulling the bottom signature off of the stack onto a drum (not shown) using air pressure suction. A gripper mechanism then contacts the upper surface of the bottom signature, pulling the bottom signature off of the stack and around the rotating drum. In this way, the bottom signature off of the stack in the hopper 62 may be removed from the stack and placed onto a moving conveyer belt below the signature grabber 60.

It has been determined by the present inventor that the signature grabber 60 will feed the CD-ROM holders 20 most reliably when they are inclined at an angle so that they are substantially tangential to the drum of the signature grabber 60. Provision of the land 32 on the leading edge of the CD-ROM holder 20 provides a flexible space to allow the CD-ROM holder 20 to begin moving around the signature grabber 60 before the grabber 60 grips the CD-ROM 10/spacer 28 portion of the holder 20. Such flexibility of the CD-ROM holder 20 during the initial grabbing of the holder 20 greatly facilitates the grabbing operation. The inclusion of the spacer 28 around the CD-ROM 10 also makes the signature grabbing process more reliable. Use of the cardboard spacer 28 which is approximately the same thickness as the CD 10 provides a consistent thickness reading as the CD-ROM holder 20 moves through the signature grabber 60. The signature grabber 60 includes a caliper mechanism which continuously reads the thickness of the signature as it is being pulled from the hopper 62. If the thickness is out of tolerance, the signature grabber 60 halts operation because more than one signature may have been inadvertently grabbed from the hopper 62. By providing a relatively consistent thickness in the area around the CD-ROM 10, the occurrence of false halts by the signature grabber 60 is greatly minimized.

Figure 11:
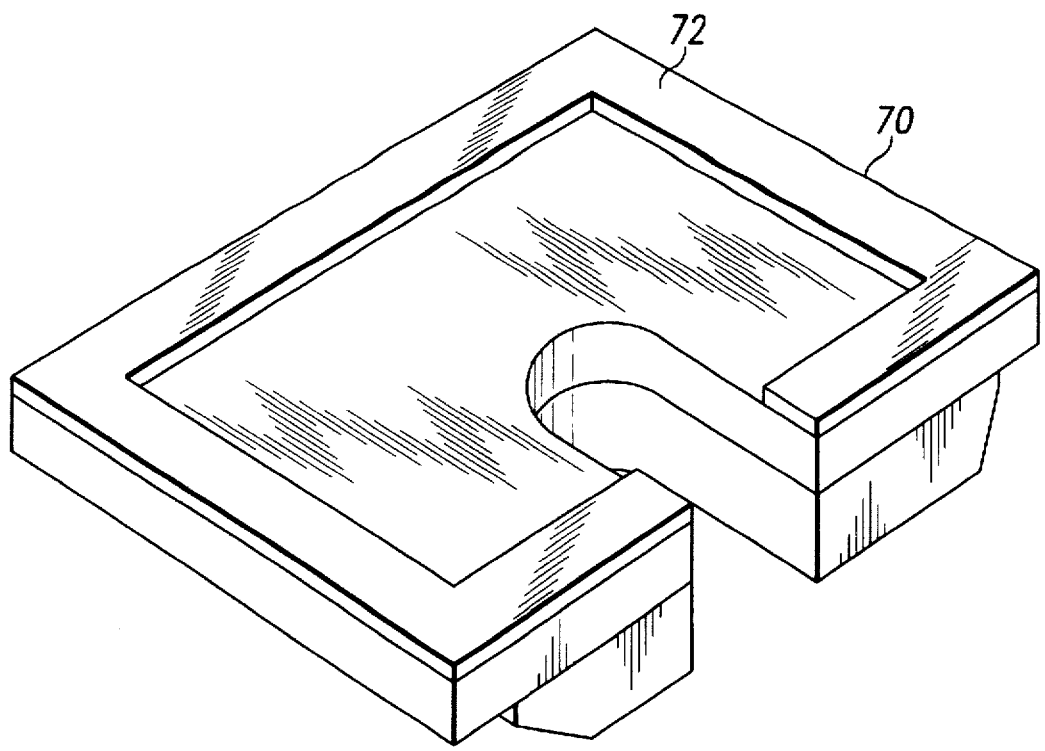
FIG. 11 is a perspective view of a book trimmer pressure pad for use with the CD-ROM holder of the present invention.
Figure 1:
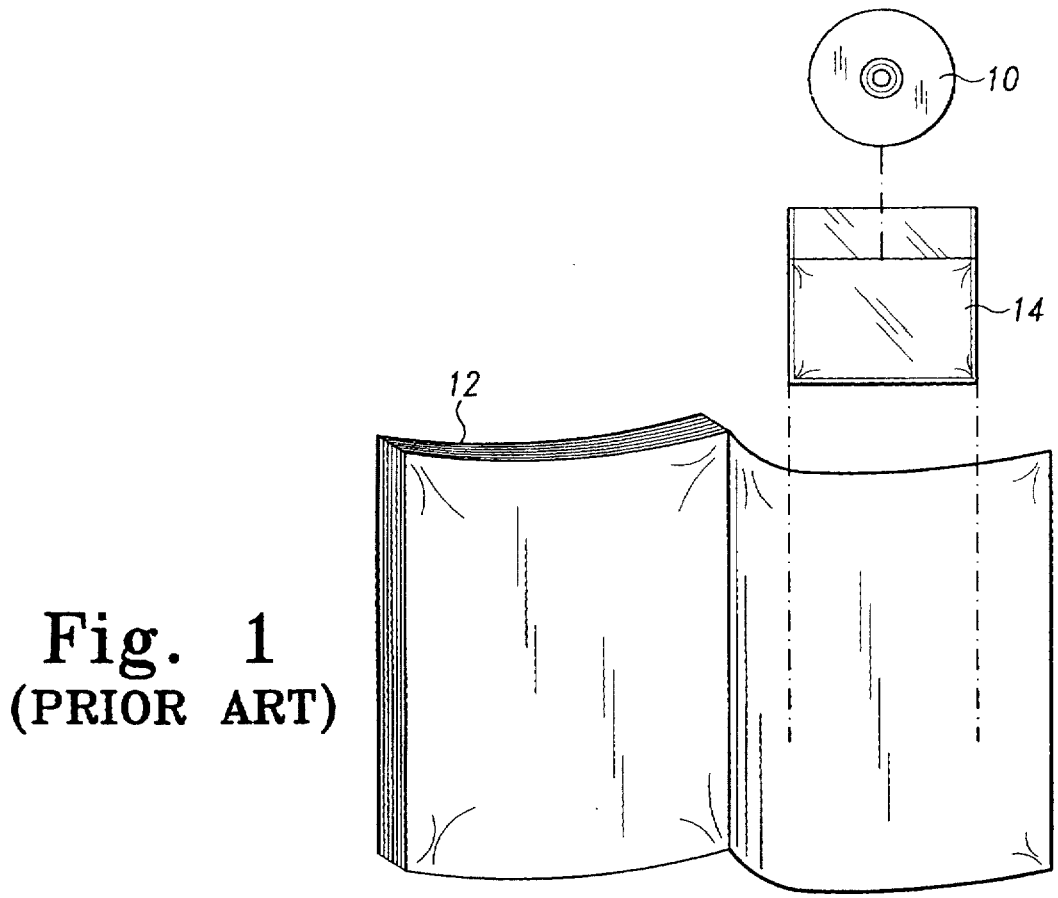
Figure 2:
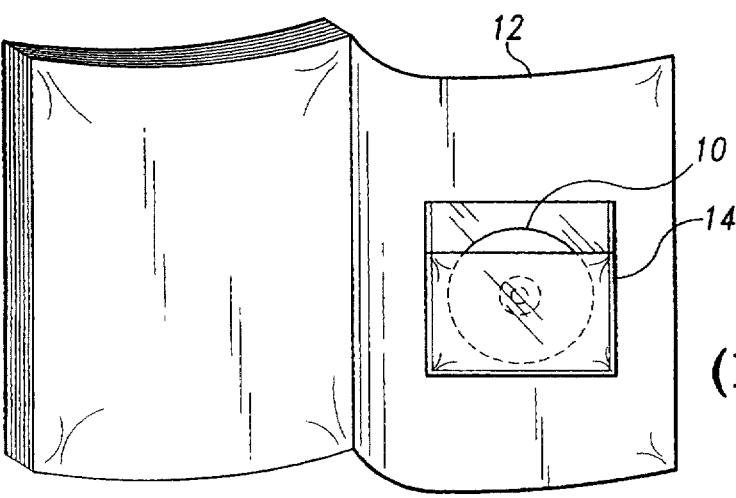

After all of the book signatures have been assembled and the binding operation has been completed, the edges of the books 12 must be trimmed with a cutting knife. In preparation for this cutting operation, the book 12 is placed into a press and pressure is applied to the book so that the pages are compacted in order to facilitate the cutting operation. When using a standard prior art press, the consistent pressure applied across the back cover of the book 12 containing the CD-ROM holder 11 can leave an impression of the CD-ROM 10/spacer 28 in the back cover 50 of the book. In order to avoid this, the present invention provides for a specialized pressure pad 70 for the trimmer press, as illustrated in FIG. 11. The pressure pad 70, when mounted into the trimmer press, will contact the back cover 50 of the bound book 12. A relatively narrow raised lip 72 is formed around the exterior edge of the pressure pad 70. In a preferred embodiment, the raised lip 72 has a width of approximately one quarter inch. The pressure pad 70 therefore provides pressure onto the back cover 50 of the book 12 only around the outer edge where the book is being trimmed, not directly upon the CD-ROM holder 20. This prevents the CD-ROM holder 20 from creating an impression on the back cover 50, thereby providing a much cleaner binding.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. For example, the concepts of the present invention are not restricted to use with CD-ROMs, but are equally applicable to any data disk format, including non-disk-shaped memories, whether now known or hereafter developed. Also, the holder may be formed from any material, even though vinyl is the preferred material due to its ability to be heat sealed. Additionally, while a perfect binding process has been used for illustrative purposes herein, the holder of the present invention may be used with any binding process.

What is claimed is:

1. A data disk holder suitable for binding, comprising:
   first and second sheets of heat-sealable material;
   a data disk positioned between the first and second sheets; and
   at least one heat-seal fusing the first and second sheets;
   wherein the data disk is substantially surrounded by the heat-seal and cannot be removed from the holder without breaking the heat-seal or cutting one of the first and second sheets, wherein the at least one heat-seal includes a longitudinal heat-seal extending substantially an entire longitudinal length of the holder, thereby forming a land separated from the data disk by the longitudinal heat-seal and thereby forming a tear line along the longitudinal heat-seal.

2. The holder of claim 1, wherein the first and second sheets are vinyl.

3. The holder of claim 1, wherein the data disk is a CD-ROM.

4. The holder of claim 1, wherein the at least one heat-seal includes a plurality of parallel seals along one edge of the holder, wherein the plurality of parallel seals create a region of relative structural rigidity.

5. The holder of claim 1, further comprising:

a spacer substantially surrounding the data disk, wherein the spacer is substantially surrounded by the heat-seal.

6. The holder of claim 5, wherein the spacer is formed from cardboard having a cardboard thickness substantially equal to a data disk thickness.

7. A method for binding a data disk into a book, comprising the steps of:

a) providing first and second sheets of heat-sealable material;

b) positioning the data disk between the first and second sheets;

c) forming at least one heat-seal fusing the first and second sheets, thereby forming a data disk holder, wherein the data disk is substantially surrounded by the heat-seal, including forming a longitudinal heat-seal extending substantially an entire longitudinal length of the holder, thereby forming a land separated from the data disk by the longitudinal heat-seal and thereby forming a tear line along the longitudinal heat-seal;

d) providing at least one printed signature;

e) gathering the holder with the at least one signature; and f) binding the holder and the at least one signature in order to form the book.

8. The method of claim 7, wherein step (a) comprises providing first and second sheets formed of vinyl.

9. The method of claim 7, wherein step (b) comprises positioning a CD-ROM between the first and second sheets.

10. The method of claim 7, further comprising the step of:

g) positioning a spacer between the first and second sheets and substantially surrounding the data disk, wherein the spacer is substantially surrounded by the heat-seal.

11. The method of claim 7, wherein the holder is bound at a location of the land.

12. A method for binding a data disk into a book, comprising the steps of:

a) providing first and second sheets of heat-sealable material;

b) positioning the data disk between the first and second sheets;

c) forming at least one heat-seal fusing the first and second sheets, thereby forming a data disk holder, wherein the data disk is substantially surrounded by the heat-seal, including forming a plurality of parallel seals along one edge of the holder, wherein the plurality of parallel seals create a region of relative structural rigidity;

d) providing at least one printed signature;

e) gathering the holder with the at least one signature; and f) binding the holder and the at least one signature in order to form the book; and g) trimming the book such that the region of relative structural rigidity is removed from the book.

13. A method for forming a data disk holder suitable for binding, comprising the steps of:

a) providing first and second sheets of heat-sealable material;

b) positioning the data disk between the first and second sheets; and c) forming at least one heat-seal fusing the first and second sheets, thereby forming a data disk holder, wherein the data disk is substantially surrounded by the heat-seal, including forming a longitudinal heat-seal extending substantially an entire longitudinal length of the holder, thereby forming a land separated from the data disk by the longitudinal heat-seal and thereby forming a tear line along the longitudinal heat-seal.

14. The method of claim 13, wherein step (c) further comprises:

c.1) providing a die having a heat-seal pattern thereon;

c.2) heating the die; and c.3) pressing the heated die upon the first and second sheets, wherein said pressing forms at least one heat-seal fusing the first and second sheets, thereby forming a data disk holder, wherein the spacer is substantially surrounded by the heat-seal.

15. The method of claim 13, wherein step (a) comprises providing first and second sheets formed of vinyl.

16. The method of claim 13, wherein step (b) comprises positioning a CD-ROM between the first and second sheets.

17. The method of claim 13, wherein step (c) comprises forming a plurality of parallel seals along one edge of the holder, wherein the plurality of parallel seals create a region of relative structural rigidity.

18. The method of claim 13, further comprising the step of:

d) positioning a spacer between the first and second sheets and substantially surrounding the data disk, wherein the spacer is substantially surrounded by the heat-seal.

* * * * *

UNITED STATES PATENT AND TRADEMARK OFFICE
CERTIFICATE OF CORRECTION

PATENT NO. : 5,782,349  
DATED : July 21, 1998  
INVENTOR(S) : Combs

Page 1 of 2

It is certified that error appears in the above-identified patent and that said Letters Patent is hereby corrected as shown below:

Please delete drawing sheet 1 of 8 and substitute drawing sheet of 1 of 8 as per attached.

Signed and Sealed this

Seventh Day of December, 1999

Attest:

Q. TODD DICKINSON

*Attesting Officer*  *Acting Commissioner of Patents and Trademarks*